Patented Nov. 14, 1933

1,935,575

UNITED STATES PATENT OFFICE 1,935,575

HANDLING SODIUM PHOSPHATE

Louis Neuberg, Rahway, N. J., assignor to The Warner Chemical Company, New York, N. Y., a corporation of New Jersey No Drawing. Application August 11, 1932
Serial No. 628,447

10 Claims. (Cl. 23—239)

This invention relates to improvements in handling sodium phosphate; and it comprises certain improvements in handling hydrated disodium phosphate by maker and user wherein stock supplies of liquid phosphate of soda are provided in bulk convenient for storage, shipping and handling by producing hot aqueous solutions of disodium phosphate of a concentration sufficient to permit crystallization on cooling, such solutions usually containing around 60 per cent of water and being of a composition approximating $Na_2HPO_4.12H_2O$ and transferring the hot liquid to a stock chamber for preservation in bulk against crystallization and change of composition, said chamber being closed against escape of vapors and access of air and being insulated to limit loss of heat; all as more fully hereinafter set forth and as claimed.

The ordinary "phosphate of soda" of commerce is a crystalline salt, dodecahydrated disodium hydrogen phosphate, $Na_2HPO_4.12H_2O$. It contains 40 per cent of actual disodium phosphate, $Na_2HPO_4$, and 60 per cent of water. Although a dry, solid material, it is mostly water. It is used in vast quantities in various industries; and is an important chemical in textile arts. Generally, it is used as dilute aqueous solutions made from the commercial crystals. Because of the scale of sale, any economies which can be effected in production and handling of phosphate of soda are worth while. It is all made, sold and used under strict specification as to the purity and freedom from foreign matter; and it must comply with the formula. The necessity for frequent chemical control is burdensome to maker and user. This necessity arises mainly from the inconvenient physical properties of the salt.

Phosphate of soda goes into commerce as masses of loose dry crystals, packaged in drums, casks and bags; 200 pound bags being usual for short-distance transportation. Although a physically dry granular material, it nevertheless, as stated contains 60 per cent water; this water existing as water of crystallization. The salt has a substantial vapor tension at ordinary temperatures and it tends to effloresce on exposure to dry air with production of dust. It melts in its water of crystallization at temperatures between 95° F. and 115° F.; temperatures not far above atmospheric temperatures in summer and in factories. Thermally, however, either the solid or the liquid salt forms a tolerably stable system; the interchange of rather large amounts of energy being necessary to convert either into the other. Much heat is rendered latent in melting and evolved in crystallization. Fusion by high temperatures in handling is therefore generally only local; the material cakes but does not melt.

The dry crystallized salt is extremely soluble in water and in the presence of moisture at ordinary temperatures, that is in moist air, it tends to take up $CO_2$ from the air; absorption going on to an equilibrium between monosodium phosphate and sodium bicarbonate.

To the consumer, as well as to the maker, these pecularities of phosphate of soda are a source of annoyance and expense; partly because of the necessity for continual testing of phosphate in stock and arriving in bags. Stock phosphate deteriorates in the sense of irregular local changes. A pile on the floor or in a bin is apt to develop efflorescence or caking here and there. Bagged phosphate if many days out of the factory is apt to effloresce or cake; in either case with a change in composition; and is apt to be dirty, dusty, and contain bag fibers. Production of dust is a source of loss and this particular dust is undesirable in a textile factory. With phosphate packaged in barrels and drums, the difficulties are not so extreme although caked material which must be dug out, is sometimes troublesome. Old and deteriorated stock in a textile plant is sometimes returned to the maker for resolution and recrystallization—re-standardization, so to speak.

The manufacture of pure, clean, dry phosphate of soda crystals with economy of labor, materials and time is a matter of much skill and attention to detail. In the usual method natural calcium phosphate is decomposed with sulfuric acid to make a solution of phosphoric acid and this is neutralized to disodium phosphate. A precipitate of insoluble phosphates, carrying most but not all the impurities, forms and this is filtered off and discarded. The concentrated hot liquid is cooled to give a crop of disodium phosphate crystals; and a mother liquor. The hot concentrated liquid must be dilute enough to provide this mother liquor; that is, it must contain more water than corresponds to the 60:40 ratio of the crystals. The crystals are separated from the mother liquor, which is mostly quite impure, drained and dried. Drying is a serious technical problem, because low temperatures are necessary. Dust losses occur and collected dust must be reprocessed. The actual methods in use in the factory are more complicated, because of recycling, reconcentrating and purifying mother liquors, as well as recrystallizations, but in principle, the method is as stated. In a later and better method, purification is effected prior to formation of disodium phosphate, the acid being half-neutralized to form monosodium phosphate and the monosodium phosphate crystallized from a hot liquor by cooling to give crystals and a mother liquor carrying impurities. This crystallization is easier to effect than that of disodium phosphate. The monosodium phosphate crystals are re-dissolved and neutralized to form disodium phosphate, which is then recovered in crystalline form. The mother liquor being pure, there is less trouble in this method. Dust losses are as before.

In the present invention, the stated difficulties with commercial phosphate are avoided and a number of new results of economic importance to both maker and user are secured, by substituting as a marketable material a bulk stock of liquid phosphate of soda for the usual mass of loose dry solid crystals. A hot pure liquid aqueous disodium phosphate preparation of such concentration that it would crystallize as a whole on cooling, is prepared and this is transferred to a stock chamber, where it is kept as a body hot enough to prevent crystallization, being protected against evaporation and access of air pending use. With a stock chamber of ordinary dimensions, holding, say, 15 to 50 tons, loss of heat by radiation and convection is slight in any reasonable time and this can be further lessened by ordinary insulation, such as cork, asbestos, etc. Heating means can however be used. Small and exposed pipe fittings and valves should be avoided or provided with heating means. From the stock chamber, the hot liquid can be piped to a point of consumption, there ordinarily entering another stock chamber drawn on by the user. Or it can be transferred from point to point in tank cars or tank trucks. A tank truck carrying about 15 tons molten phosphate at, say, 175° F., and insulated by thin cork board, will hold its contents in a homogeneous liquid state at summer temperature almost indefinitely and, even in winter temperature, for 10 to 15 hours.

At 115° F., crystallization may begin, but it is not complete until all the liquid drops to about 95° F.; a drop resisted by the exothermic nature of crystallization and the fact that the lower limit is not much above factory temperature; i. e., the temperature differential between air and liquid is not great. The bulk stock is resistant to changes.

In this manner of operating, handling of an efflorescent, fusible, caking solid, with the attendant difficulties in production and transfer, is replaced by bulk handling of a stable liquid preparation; a liquid which can be used with as much ease as, and in much the same way as, the standard solutions of the laboratory. Measurement replaces weighing in making the dilute solution required in a textile factory. The manufacturer provides, once for all, a clean, clear, pure liquid of standard strength and of substantially uniform composition. A determination of Baumé and temperature gives all the information that is necessary as to composition; analytical determinations being superfluous. One test may do for a lot of many tons. The phosphate is handled, so to speak, in a closed system between the manufacturer, who is responsible for purity, cleanness and composition, and the consumer. In a closed container the composition cannot change; the water: solids ratio is constant. All danger of accidental contamination is obviated; there are no bag fibers in the product, there is no dusting and no caking. Even with an accidental chilling, the liquid cannot entirely set until it is cooled to 95° F. and then enough further heat must be abstracted to solidify the whole mass. And re-heating brings the mass back to its original condition. In a plant with a tank supply of liquid phosphate, the liquid can be distributed to as many points of use as may be desired. Making dilute solutions with water becomes a matter of mixing one liquid with another. No filtration is necessary.

I ordinarily make a hot liquid containing about the same amount of water as the solid dodecahydrate, namely 60 per cent; this being a standard strength. However, weaker and stronger liquids can be made; there being some advantage in the latter. Solutions can be made of high concentrations; with as low as 45 per cent water for example. The standard strength mentioned, a liquid containing 60 per cent water and 40 per cent dry phosphate, $Na_2HPO_4$ is considerably stronger than any of the aqueous liquids ordinarily obtained in a phosphate making factory; and it must be specially made. The liquids which are made and are used in making crops of dodecahydrated disodium phosphate crystals are weaker than this, being always dilute enough to give a mother liquor; this being particularly necessary where crystallization is also a purifying action.

It is essential that the hot liquid phosphate be pure enough to meet commercial standards. In preparing it, recrystallized disodium phosphate may be used in the wet state with sufficient dust phosphate to bring the total water to the desired point; usually 60 per cent; and the mixture melted. The described monosodium phosphate may be dissolved in the right amount of water to a hot solution, sodium carbonate added till free liberation of $CO_2$ ceases and then enough caustic soda to make disodium phosphate. The amount of water used is advantageously that corresponding to $Na_2HPO_4.12H_2O$. This is a particularly good method since it avoids altogether the troublesome crystallization of dodecahydrated disodium phosphate usual in phosphate factories. Disodium phosphate does not exist in solid form at any time.

I regard about 175° F. as a standard temperature for storing and transportation. Loss of water by evaporation increases rapidly at higher temperatures; absorption of $CO_2$ from the air increases at lower. However, with ordinary types of closed tanks, neither difficulty is serious. The liquid retains its mobile characteristics down to about 115° F., when crystallization is apt to begin.

For testing purposes, a sample is withdrawn from the storage tank and its temperature and specific gravity determined. There is commonly a drop in temperature in doing this and I find it convenient to use 135° F. as a standard testing temperature, reducing observations at other temperatures to a basis of 135° F. At 135° F., a commercial solution or "liquid phosphate" having the composition of dodecahydrated solid crystallized phosphate has a specific gravity of 1.43. By the use of the subjoined tables, observations at other temperatures can be corrected to 135° F. In these tables a plus correction is to be made to the specific gravity for temperatures above 135° F. and a minus correction for temperatures below 135° F. and down to what I regard as a critical point, 115° F.

Table 1

| Temp. | Corr. | Temp. | Temp. | Corr. | Temp. |
|---|---|---|---|---|---|
| 136 | +.0004− | 134 | 146 | +.0042− | 124 |
| 137 | +.0008− | 133 | 147 | +.0046− | 123 |
| 138 | +.0011− | 132 | 148 | +.0049− | 122 |
| 139 | +.0015− | 131 | 149 | +.0053− | 121 |
| 140 | +.0019− | 130 | 150 | +.0057− | 120 |
| 141 | +.0023− | 129 | 151 | +.0061− | 119 |
| 142 | +.0027− | 128 | 152 | +.0065− | 118 |
| 143 | +.0030− | 127 | 153 | +.0068− | 117 |
| 144 | +.0034− | 126 | 154 | +.0072− | 116 |
| 145 | +.0038− | 125 | 155 | +.0076− | 115 |

\+ Indicates add correction to observed reading.
− Indicates deduct correction from observed reading.

From the following table, the pounds of phosphate of soda per gallon at 175° F. can be calculated from the specific gravity at 135° F.

Table 2

| Sp. gr. at 135° F./60° F. | Lbs. $Na_2HPO_4.12H_2O$ per gallon at 175° F. | | | | | | | | | |
|---|---|---|---|---|---|---|---|---|---|---|
|  | 0 | 1 | 2 | 3 | 4 | 5 | 6 | 7 | 8 | 9 |
| 1.37 | 9.83 | 0.86 | 0.89 | 0.92 | 0.95 | 0.98 | *0.02 | *0.05 | *0.08 | *0.11 |
| 1.38 | 10.14 | .17 | .20 | .23 | .26 | .29 | .32 | .35 | .38 | .41 |
| 1.39 | .44 | .47 | .50 | .53 | .56 | .60 | .63 | .66 | .69 | .72 |
| 1.40 | .75 | .78 | .81 | .84 | .87 | .90 | .93 | .96 | .99 | *.02 |
| 1.41 | 11.05 | .08 | .11 | .14 | .18 | .21 | .24 | .27 | .30 | .33 |
| 1.42 | .36 | .39 | .42 | .45 | .48 | .51 | .54 | .57 | .60 | .63 |
| 1.43 | .66 | .69 | .72 | .76 | .79 | .82 | .85 | .88 | .91 | .94 |
| 1.44 | .97 | *.00 | *.03 | *.06 | *.09 | *.12 | *.15 | *.18 | *.21 | *.24 |
| 1.45 | 12.27 | .30 | .34 | .37 | .40 | .43 | .46 | .49 | .52 | .55 |

The pounds of phosphate of soda per gallon at 175° F. can be converted into pounds per gallon at the observed tank temperature by using the following table:

Table 3

| Temp. | Corr. | Temp. |
|---|---|---|
| 174–176 | .00 |  |
| 177–180 | −.01+ | 170–173 |
| 181–183 | −.02+ | 167–169 |
| 184–187 | −.03+ | 163–166 |
| 188–190 | −.04+ | 160–162 |
| 191–193 | −.05+ | 175–159 |

As an example of the use of these tables, a particular lot of tank liquid at a temperature of 178° F. was tested at 127° F. It had a specific gravity of 1.395.

Table 1 shows that a minus correction of −.0030 is necessary to convert the gravity reading at 127° F. to the gravity at the standard temperature of 135° F. The corrected gravity is 1.392.

From Table 2 it is seen that the specific gravity of 1.392 corresponds to 10.50 pounds per gallon at 175° F. But as the observed tank temperature is 178° F. a correction must be made. From Table 3 with a temperature of 178° C. the correction is −.01; and the true content is 10.49 pounds.

The foregoing tables are meant to apply to liquids containing approximately 60 per cent water. As stated, this is a standard commercial strength. There are, however, some advantages in shipping liquids containing somewhat less water; say 45 to 55 per cent water. The difficulty with these stronger liquids is that they crystallize at a higher temperature than 115° F.

The present system may be applied to the marketing of trisodium phosphate, which also crystallizes with 12 molecules of water, and to other soluble sodium phosphate materials.

What I claim is:—

1. As an improvement in the technique of handling disodium phosphate as a merchantable commodity, the method which comprises producing a hot aqueous disodium phosphate material as a body of liquid of substantial volume and having a composition corresponding approximately to $Na_2HPO_4.12H_2O$, maintaining said body in a liquid state and at a temperature well above its solidifying point without substantial alteration in its composition and withdrawing portions of said hot liquid body for use in a diluted form.

2. As an improvement in the technique of handling disodium phosphate as a merchantable commodity, the method which comprises producing an aqueous disodium phosphate material as a body of hot liquid of substantial size and having a composition corresponding approximately to $Na_2HPO_4.12H_2O$, transferring said hot liquid to a stock chamber closed against the atmosphere and the escape of moisture and insulated to delay loss of heat, thereby maintaining said aqueous material in a liquid state and at a temperature well above its solidifying point, preserving against crystallization and preventing alteration of said composition by the escape of vapors and by the access of air and withdrawing portions of said hot liquid body from the chamber for use without solidification.

3. The process of claim 1, in which the liquid is maintained at a temperature of 175° F. to 115° F.

4. The process of claim 1, in which the liquid is maintained at approximately 175° F.

5. In the production, handling and use of disodium phosphate as a commercial material, the process which comprises producing a body of a hot liquid aqueous disodium phosphate material of substantial volume, said liquid being sufficiently concentrated to crystallize on cooling, preventing crystallization of disodium phosphate by maintaining said body at temperatures above the crystallizing point pending use and withdrawing portions of said hot liquid material for use.

6. The process of handling phosphate of soda which comprises making in the factory a liquid preparation containing 60 per cent water and 40 per cent $Na_2HPO_4$ and capable of setting as a solid cake at a temperature around 100° F., said liquid being made at a materially higher temperature, maintaining the liquid preparation at a high temperature to keep the material liquid until the material is used, preventing escape of $H_2O$ and entry of $CO_2$ during said maintenance and delivering said hot liquid material for use as the dodecahydrated disodium phosphate.

7. In making and handling phosphate of soda for commercial use, the process which comprises making at a high temperature an aqueous liquid preparation containing $Na_2HPO_4$ and not more than 60 per cent of water, preserving the original hot liquid in a hot condition without allowing it to solidify or change in composition and delivering said hot aqueous liquid for use as disodium phosphate.

8. As an improvement in the technique of handling disodium phosphate, the process which comprises establishing and maintaining a body of hot liquid $Na_2HPO_4.12H_2O$ in bulk, said body being of substantial size, shielding said body against loss of water and of heat and against access of air, said body serving as a stock supply, withdrawing portions of said stock supply for use and replenishing the supply with fresh portions of said hot liquid.

9. An improved method of making and handling disodium phosphate for commercial use which comprises making hydrated disodium phosphate as a hot liquid composed of approximately 40 per cent $Na_2HPO_4$ and 60 per cent $H_2O$, storing said liquid in a large body maintained at a temperature above 115° F., preventing escape of steam from said body and access of air thereto and withdrawing portions of the hot liquid from said body for use.

10. In the production, handling and use of commercial phosphates of soda, the process which comprises producing a body of a hot liquid aqueous sodium phosphate material of substantial volume, said liquid being sufficiently concentrated to crystallize on cooling, preventing crystallization of sodium phosphate by maintaining said body at temperatures above the crystallizing point pending use and withdrawing portions of said hot liquid material for use.

LOUIS NEUBERG.

CERTIFICATE OF CORRECTION

Patent No. 1,935,575.                                November 14, 1933.

LOUIS NEUBERG.

It is hereby certified that error appears in the printed specifications of the above numbered patent requiring correction as follows: Page 3, line 46, for the last number in column 3, of boxed table, for "175-159" read 157-159; and that the said Letters Patent should be read with this correction therein that the same may conform to the record of the case in the Patent Office.

Signed and sealed this 5th day of December, A. D. 1933.

F. M. Hopkins (Seal)                                Acting Commissioner of Patents.